US011303348B1

(12) United States Patent
Staple et al.

(10) Patent No.: US 11,303,348 B1
(45) Date of Patent: Apr. 12, 2022

(54) SYSTEMS AND METHODS FOR ENHANCING COMMUNICATION NETWORK PERFORMANCE USING VECTOR BASED DEEP LEARNING

(71) Applicant: Ball Aerospace & Technologies Corp., Boulder, CO (US)

(72) Inventors: Bevan D. Staple, Longmont, CO (US); Jennifer H. Lee, Boulder, CO (US); Jason Monin, Dayton, OH (US); Cynthia Wallace, Louisville, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 198 days.

(21) Appl. No.: 16/886,154

(22) Filed: May 28, 2020

Related U.S. Application Data

(60) Provisional application No. 62/854,152, filed on May 29, 2019.

(51) Int. Cl.
*H04B 7/08* (2006.01)
*G06N 3/08* (2006.01)
*G06N 3/04* (2006.01)

(52) U.S. Cl.
CPC ........... *H04B 7/086* (2013.01); *G06N 3/0454* (2013.01); *G06N 3/082* (2013.01)

(58) Field of Classification Search
CPC ....... H04B 7/086; G06N 3/0454; G06N 3/082
See application file for complete search history.

(56) References Cited

U.S. PATENT DOCUMENTS

| 5,588,073 | A | 12/1996 | Lee et al. |
| 5,636,326 | A * | 6/1997 | Stork ................... G01N 33/005 706/25 |
| 5,719,794 | A | 2/1998 | Altshuler et al. |
| 5,960,391 | A | 9/1999 | Tateishi et al. |
| 6,075,991 | A | 6/2000 | Raleigh et al. |
| 6,252,627 | B1 | 6/2001 | Frame et al. |
| 6,437,692 | B1 | 8/2002 | Petite et al. |
| 6,597,394 | B1 | 7/2003 | Duncan et al. |
| 6,820,053 | B1 | 11/2004 | Ruwisch |
| 7,020,501 | B1 | 3/2006 | Elliott et al. |

(Continued)

FOREIGN PATENT DOCUMENTS

CN 108875595 11/2018

OTHER PUBLICATIONS

Official Action for U.S. Appl. No. 16/668,826, dated Jul. 28, 2020 11 pages.

(Continued)

*Primary Examiner* — David Bilodeau
(74) *Attorney, Agent, or Firm* — Sheridan Ross P.C.

(57) ABSTRACT

Systems and methods for forming radio frequency beams in communication systems are provided. Signals from one or more devices are received at a base station and are processed using a vector based deep learning (VBDL) model or network. The VBDL model can receive and process vector and/or spatial information related to or part of the received signals. An optimal beamforming vector for a received signal is determined by the VBDL model, without reference to a codebook. The VBDL model can incorporate parameters that are pruned during training to provide efficient operation of the model.

18 Claims, 11 Drawing Sheets

(56) References Cited

U.S. PATENT DOCUMENTS

| | | | |
|---|---|---|---|
| 7,590,098 B2 | 9/2009 | Ganesh | |
| 8,019,544 B2 | 9/2011 | Needelman et al. | |
| 8,583,371 B1 | 11/2013 | Goodzeit et al. | |
| 8,929,936 B2 | 1/2015 | Mody et al. | |
| 9,073,648 B2 | 7/2015 | Tsao et al. | |
| 9,191,587 B2 | 11/2015 | Wright et al. | |
| 9,294,365 B2 | 3/2016 | Misra et al. | |
| 9,449,374 B2 | 9/2016 | Nash et al. | |
| 9,702,702 B1 | 7/2017 | Lane et al. | |
| 9,924,522 B2 | 3/2018 | Gulati et al. | |
| 9,927,510 B2 | 3/2018 | Waldron et al. | |
| 10,021,313 B1 | 7/2018 | Chen et al. | |
| 10,048,084 B2 | 8/2018 | Laine et al. | |
| 10,271,179 B1 | 4/2019 | Shima | |
| 10,726,830 B1* | 7/2020 | Mandal | G10L 15/16 |
| 10,879,946 B1* | 12/2020 | Shima | G06N 3/04 |
| 10,970,520 B1 | 4/2021 | Kim et al. | |
| 11,182,672 B1* | 11/2021 | Schmidt | B64C 39/024 |
| 2005/0049876 A1 | 3/2005 | Agranat | |
| 2005/0228660 A1 | 10/2005 | Schweng | |
| 2006/0030332 A1 | 2/2006 | Carrott et al. | |
| 2007/0010956 A1 | 1/2007 | Nerguizian et al. | |
| 2008/0020354 A1 | 1/2008 | Goree et al. | |
| 2008/0045235 A1 | 2/2008 | Kennedy et al. | |
| 2008/0293353 A1 | 11/2008 | Mody et al. | |
| 2009/0179142 A1 | 7/2009 | Duparre et al. | |
| 2009/0197550 A1 | 8/2009 | Huttunen et al. | |
| 2009/0268619 A1 | 10/2009 | Dain et al. | |
| 2010/0091017 A1 | 4/2010 | Kmiecik et al. | |
| 2012/0071105 A1 | 3/2012 | Walker et al. | |
| 2012/0072986 A1 | 3/2012 | Livsics et al. | |
| 2012/0163355 A1 | 6/2012 | Heo et al. | |
| 2012/0167144 A1 | 6/2012 | Avison-Fell | |
| 2012/0202510 A1 | 8/2012 | Singh | |
| 2012/0238201 A1 | 9/2012 | Du et al. | |
| 2012/0238220 A1 | 9/2012 | Du et al. | |
| 2014/0218520 A1 | 8/2014 | Teich et al. | |
| 2014/0232871 A1 | 8/2014 | Kriel et al. | |
| 2014/0282783 A1 | 9/2014 | Totten et al. | |
| 2014/0329540 A1 | 11/2014 | Duggan et al. | |
| 2015/0009072 A1 | 1/2015 | Nijsure | |
| 2016/0101779 A1 | 4/2016 | Katoh | |
| 2016/0173241 A1 | 6/2016 | Goodson et al. | |
| 2016/0187477 A1 | 6/2016 | Wang | |
| 2017/0120906 A1 | 5/2017 | Penilla et al. | |
| 2017/0123429 A1 | 5/2017 | Levinson et al. | |
| 2017/0366264 A1 | 12/2017 | Riesing et al. | |
| 2018/0019910 A1 | 1/2018 | Tsagkaris et al. | |
| 2018/0025641 A1 | 1/2018 | LaVelle et al. | |
| 2018/0033449 A1* | 2/2018 | Theverapperuma | G10L 25/84 |
| 2018/0053108 A1 | 2/2018 | Olabiyi et al. | |
| 2018/0082438 A1 | 3/2018 | Simon et al. | |
| 2018/0107215 A1 | 4/2018 | Djuric et al. | |
| 2018/0149730 A1 | 5/2018 | Li et al. | |
| 2018/0268571 A1 | 9/2018 | Park et al. | |
| 2018/0293893 A1 | 10/2018 | Yang et al. | |
| 2018/0324595 A1 | 11/2018 | Shima | |
| 2019/0049955 A1 | 2/2019 | Yabuuchi et al. | |
| 2019/0066713 A1 | 2/2019 | Mesgarani et al. | |
| 2019/0122689 A1 | 4/2019 | Jain et al. | |
| 2019/0164430 A1 | 5/2019 | Nix | |
| 2019/0213887 A1 | 7/2019 | Kitayama et al. | |
| 2019/0294108 A1 | 9/2019 | Ozcan et al. | |
| 2019/0318725 A1 | 10/2019 | Le Roux et al. | |
| 2019/0322282 A1 | 10/2019 | Theodosis et al. | |
| 2019/0353741 A1 | 11/2019 | Bolster, Jr. et al. | |
| 2019/0363430 A1 | 11/2019 | Wang et al. | |
| 2020/0327397 A1* | 10/2020 | Govea | H04L 27/36 |
| 2020/0335121 A1* | 10/2020 | Mosseri | G10L 15/16 |

OTHER PUBLICATIONS

U.S. Appl. No. 16/597,411, filed Oct. 9, 2019, Schmidt et al.
U.S. Appl. No. 16/668,826, filed Oct. 30, 2019, Shima.
U.S. Appl. No. 16/693,992, filed Nov. 25, 2019, Tchilian.
U.S. Appl. No. 16/745,725, filed Jan. 17, 2020, Tchilian et al.
U.S. Appl. No. 16/806,367, filed Mar. 2, 2020, Frye et al.
U.S. Appl. No. 16/886,983, filed May 29, 2020, Regan.
"Deep Learning Meets DSP: OFDM Signal Detection," KickView Tech Blog, Feb. 13, 2018, 25 pages [retrieved online from: blog.kickview.com/deep-learning-meets-dsp-ofdm-signal-detection/].
Buchheim "Astronomical Discoveries You Can Make, Too!" Springer, 2015, pp. 442-443.
Ma et al. "Attitude-correlated frames approach for a star sensor to improve attitude accuracy under highly dynamic conditions," Applied Optics, Sep. 2015, vol. 54, No. 25, pp. 7559-7566.
Ma et al. "Performance Analysis of the Attitude-correlated Frames Approach for Star Sensors," IEEE, 3rd IEEE International Workshop on Metrology for Aerospace (MetroAeroSpace), Firenze, Italy, Jun. 22-23, 2016, pp. 81-86.
Nair et al. "Accelerating Capsule Networks with Tensor Comprehensions," Princeton, May 2018, 8 pages.
Ni et al. "Attitude-correlated frames adding approach to improve signal-to-noise ratio of star image for star tracker," Optics Express, May 2019, vol. 27, No. 11, pp. 15548-15564.
Wang "Research on Pruning Convolutional Neural Network, Autoencoder and Capsule Network," before Oct. 9, 2018, 11 pages.
Wang et al. "An Optimization View on Dynamic Routing Between Capsules," ICLR 2018 Workshop, Feb. 2018, 4 pages.
Official Action for U.S. Appl. No. 15/973,022, dated Oct. 9, 2018 16 pages.
Notice of Allowance for U.S. Appl. No. 15/973,022, dated Feb. 20, 2019 10 pages.
Official Action for U.S. Appl. No. 15/973,003, dated Mar. 20, 2020 35 pages.
Official Action for U.S. Appl. No. 16/668,826, dated Mar. 3, 2020 10 pages.
Gu et al. "Continuous Deep Q-Learning with Model-based Acceleration," Proceedings of Machine Learning Research, vol. 48, 2016, pp. 2829-2838.
Happel et al. "The Design and Evolution of Modular Neural Network Architectures," Neural Networks, 1994, vol. 7, pp. 985-1004.
JOHNSON "Orbital Debris: The Growing Threat to Space Operations," 33rd Annual Guidance and Control Conference, Feb. 6, 2010, Breckenridge, CO, United States.
Peng et al. "Improving Orbit Prediction Accuracy through Supervised Machine Learning,".
Taylor "Transfer Learning for Reinforcement Learning Domains: A Survey," Journal of Machine Learning Research, 2009, vol. 10, pp. 1633-1685.
Watkins "Learning from Delayed Rewards," King's College, May 1989, Thesis for Ph.D., 241 pages.
Goodfellow et al. "Deep Learning," MIT Press, 2016, 796 pages [retrieved online from: www.deeplearningbook.org].
Official Action for U.S. Appl. No. 15/973,003, dated Oct. 21, 2020 31 pages.
Notice of Allowance for U.S. Appl. No. 16/668,826, dated Nov. 3, 2020 5 pages.

* cited by examiner

SYSTEMS AND METHODS FOR ENHANCING COMMUNICATION NETWORK PERFORMANCE USING VECTOR BASED DEEP LEARNING

CROSS-REFERENCE TO RELATED APPLICATIONS

This application claims the benefit of U.S. Provisional Patent Application Ser. No. 62/854,152, filed May 29, 2019, the entire disclosure of which is hereby incorporated herein by reference.

FIELD

Communication systems and methods in which vector based deep learning is applied for enhanced performance are provided.

BACKGROUND 5G millimeter wave (mmWave) systems promise a paradigm of higher bandwidth and thus greater connectivity over previous networks. However, 5G brings several challenges, including higher path losses experienced by 5G mmWaves from obstructions and the atmosphere that are inherent to the frequencies used by 5G systems (28-39 GHz). To address the path loss issues, 5G communication cells are smaller as compared to systems that operate at lower frequencies, and beamforming strategies are often employed for transmitter-to-receiver efficiency. As a result, the need for complex signal routing and frequent hand-off of signals between base stations (BS) can lead to safety critical impacts to quality of service (QoS) and latency (e.g., for autonomous cars). Furthermore, beamforming (that is, establishing the proper signal routing instructions) requires considerable training overhead when using predefined codebooks. In addition, 5G heterogeneous networks (HetNets) comprise a mixture of base stations and their lower-tier companions (such as micro base stations (MBS), pico base stations (PBS), femto base stations (FBS), and remote radio heads (RRH)), as well as a multitude of user equipment (UE) served by these BSs. Such HetNets suffer from significant co-channel and intra-cell interference, impacts to achievable data rate (ADR), and load balancing (LB) coordination challenges.

Alkhateeb et al, "Deep Learning Coordinated Beamforming for Highly-Mobile Millimeter Wave Systems," IEEE Access, 2018, considered a single UE supported by multiple BSs. Each signal from a UE received at a BS draws a unique RF signature of a UE's location and interaction with the transmission environment. This signature, which the authors referred to as the unique RF-signal signature (URS), was used to establish beamforming vectors for transmission from a BS to UE. Using a simple 2-dimensional representation of the URS (e.g., real and imaginary) as input, Alkhateeb then employed a deep learning (DL) technique called convolutional neural networks (CNN) to learn and predict the optimum beamforming vectors at a BS that optimized a UE's ADR. The 2D representation of the URS exploited the CNN's strength in image recognition tasks.

Systems such as that contemplated by Alkhateeb et al. showed that CNNs could be extremely fast and provide a 2× improvement in performance over the conventional codebook-search beamforming vector determination approach. The speed and performance of these CNN systems were attained by exploiting two types of CNN layers: (1) "max pooling" and (2) convolution (both of which result in some level of invariance). Max pooling is a strategy that uses the maximum value of clustered CNN nodes to reduce model complexity and enable model generalization. Convolution is the application of a convolution kernel (much like blurring) to an image. The use of these types of layers results in invariance, or a "blindness" of the network to certain transformations. For example, CNNs ignore the spatial relationships between objects in an image by assuming that different internal representations of the image (i.e., the re-positioning of objects within an image) do not change the properties of the image (i.e., the whole is viewed as invariant). While CNNs are generally effective at image classification tasks, this invariance resulting from expediency measures (such as max pooling and convolution) makes networks employing such measures prone to misclassify output results.

SUMMARY

Embodiments of the present disclosure provide systems and methods that use vector-based deep learning to improve the performance of a communications network, including but not limited to a 5G communications network. In particular, embodiments of the present disclosure employ vector based deep learning (VBDL) models. In contrast to CNNs whose efficiency strategies result in invariance, VBDL methods preserve vector information (such as object spatial relationships), which results in the model demonstrating equivariance instead. Equivariance means the model sees a transformation on the input and propagates that to yield a transformation in the output. Accordingly, VBDL approaches can improve the prediction accuracy of the prior art by overcoming various limitations of CNNs.

In an example scenario, a single BS serves multiple UE units. Embodiments of the present disclosure overcome CNN limitations of the prior-art by employing VBDL models. By employing a VBDL model to predict optimal beamforming vectors, a much higher quality result can be obtained, as this approach is not prone to the same invariance as a CNN. In accordance with at least some embodiments of the present disclosure, a VBDL model is implemented using novel methods to optimize a neural network called a Hinton capsule network (HCN). An HCN improves image-classification performance over CNNs by preserving vector-based information such as the pose (i.e., x-y position and orientation) and the relative spatial relationships of objects (i.e., parts) in an image (i.e., a whole), as well as time-dependent spatial behavior such as velocity. As such, an HCN would correctly classify images that can suffer from invariance when processed by a conventional CNN.

In accordance with further embodiments of the present disclosure, a VBDL model is implemented using novel methods to optimize a neural network called coordinate convolution (CoordConv) methods. CoordConv improves image classification accuracy of CNNs by giving standard CNN convolutional filters input a positional reference. This is done by adding at least two channels to the convolutional layer input—one for each of the Cartesian coordinates (here i and j). This additional information ensures that the CNN output is not invariant to pose, thus improving the classification accuracy. As applied in connection with at least some embodiments of the present disclosure, the CoordConv accuracy is enhanced by removing the max pooling layer and optimizing the filter size to capture the correlation between co-channel uplink signals. These enhancements will inevitably reduce the CoordConv runtime speed.

The challenge with VBDL models or approaches is that the inclusion of vector information results in high dimensional parameter space, and a much longer training time is needed. Even after the VBDL model is trained, the prediction time will be long, making it unsuitable for real-time tasks. In accordance with at least some embodiments of the present disclosure, the VBDL model is optimized for run-time performance and reduced neural network size (e.g., to fit on small devices with limited memory and processing capabilities) in real-world applications by novel pruning methods.

Additional features and advantages of embodiments of the present disclosure will become more readily apparent from the following discussion, particularly when taken together with the accompanying drawings.

DETAILED DESCRIPTION

Figure 1:
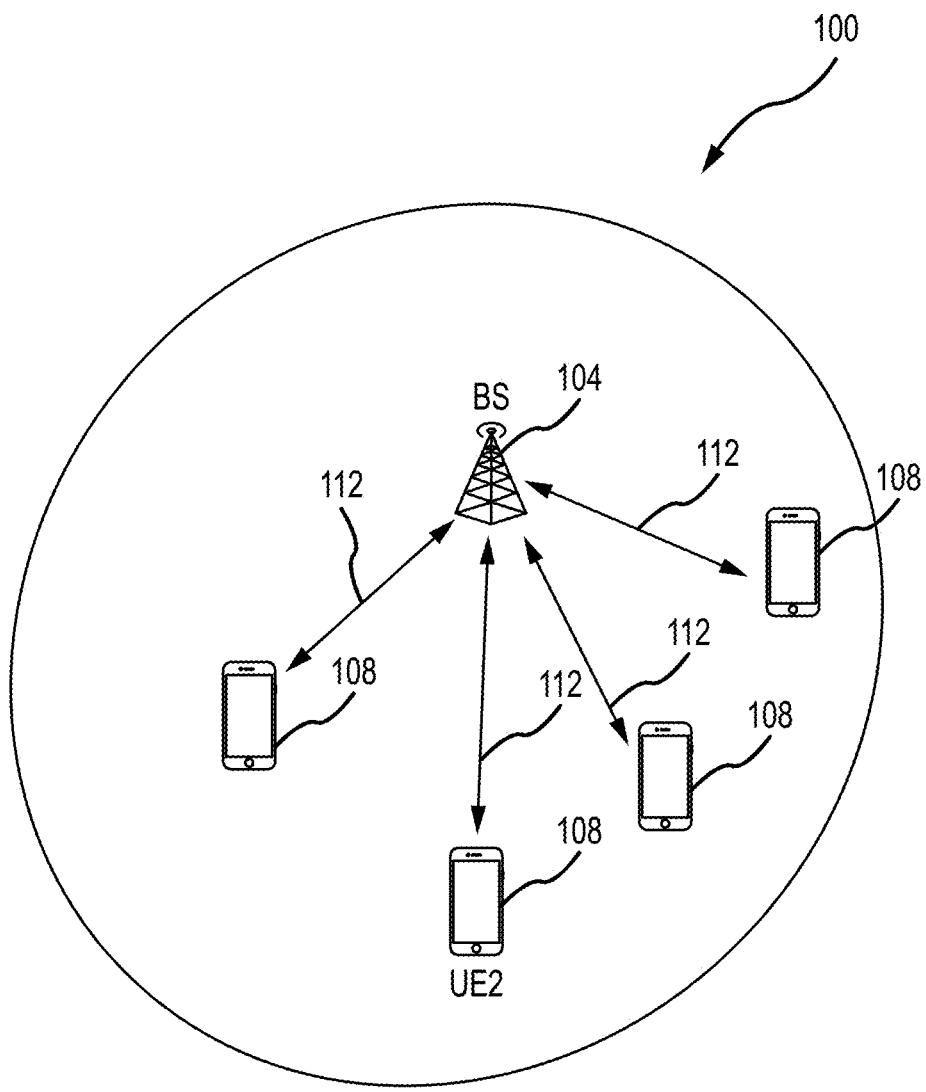
FIG. 1 depicts an example communications system scenario in which a base station serves multiple devices.

A communications system 100 such as may be operated in connection with embodiments of the present disclosure is depicted in FIG. 1. In this example, a single base station 104 is serving multiple devices 108. As an example, but without limitation, the communications system 100 can include a 5G communications system. The base station 104 can be capable of supporting multiple communication channels using multiple beams 112 that can be configured in various ways, including in power, pointing direction, and the like. An example of a base station 104 is a base station that includes one or more phased array antennas. The devices 108 can include any device capable of communicating with the base station, such as cellular telephones, Internet of things (IoT) devices, autonomous vehicle control systems, robotic systems, etc., also referred to herein as user equipment (UE). As discussed herein, embodiments of the present disclosure utilize vector based deep learning (VBDL) to determine or predict optimal beamforming vectors that can be utilized by the base station for supporting communications between the base station 104 and the connected devices 108.

Figure 2:
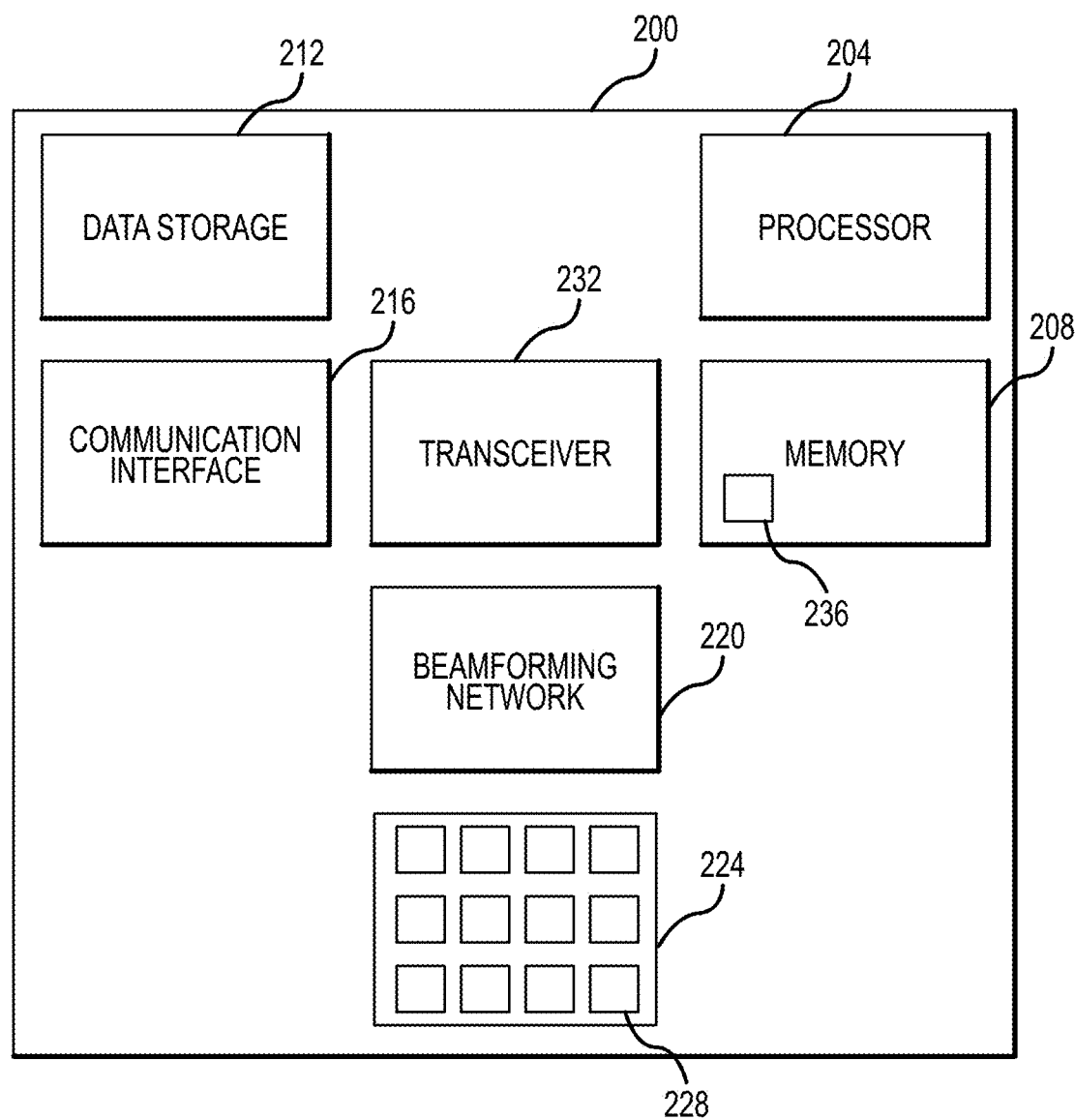
FIG. 2 depicts components of a processing system in accordance with embodiments of the present disclosure.

A base station 104 can include, can be in communication with, or can otherwise be associated with a processing system 200 for implementing a VBDL model or network as described herein. Components that can be included in such a processing system 200 are depicted in FIG. 2. The processing system 200 generally includes a processor 204, memory 208, data storage 212, and a communications interface 216. In the example of FIG. 2, in which the processing system 200 is integrated with the base station 104, the processor 204 can directly control parameters of a beamforming network 220 used to send and receive communication signals via a phased array antenna 224 that includes a plurality of antenna elements 228. A transceiver 232 can also be included for receiving radio frequency signals from and providing radio frequency signals to the beam forming network and the phased array antenna 224. Alternatively, or in addition, the processor 204 can control one or more base stations 104 that are separate from the processing system 200, in which case signals and commands can be passed between the processing system and the base station or stations 104 through the communications interface 216.

The processor 204 may comprise a general purpose programmable processor, a set of processors, a field programmable gate array (FPGA), a controller, or the like. In accordance with embodiments of the present disclosure, the processor 204 is in the form of, includes, or is associated with a graphical processing unit (GPU). The GPU can be operated to efficiently process image data depicting RF signal signatures (URS) used to establish beam forming vectors in connection with a VBDL network as described herein. The processor 204 can operate to execute application programming 236 stored in the memory 208 and/or in the data storage 212. The application programming 236 can include firmware or software that implements methods in accordance with embodiments of the present disclosure, including implementing a VBDL model as described herein. In addition, the processor 204 can operate to process data, including signal signature data regarding signals passed between devices 108 and the base station 104.

The memory 208 may comprise solid-state, volatile, and/or non-volatile memory. Examples of suitable memory devices include RAM, DRAM, SDRAM, etc. The memory 208 can provide short and/or long term storage for the application programming 236, operating system software, data received from various sources, intermediate data products, beamforming code book data, and calculated data. The data storage 212 may comprise a hard disk drive, solid-state drive, solid-state memory, or other device for the storage of application programming and data.

The communication interface 216 may support communications between the processing system 200 and other systems. For example, the processing system 200 may be in communication with one or more base stations 104, another processing system 200, a network authority, or the like, via the communication interface 216. As examples, but without limitation, the communication interface 216 can include an Ethernet interface, a microwave communication interface, a satellite communication interface, a WiFi interface, a fiber optic network interface, or the like.

The beamforming network 220 generally includes feed lines for carrying signals between individual antenna elements 228 of the phased array antenna 224 and the transceiver 232. The beamforming network 220 can further include, phase shifters, amplifiers, delay lines, attenuators, and the like, at least some of which are variable. As can be appreciated by one of skill in the art after consideration of the present disclosure, by selectively controlling the elements of the beamforming network 220, the attributes of RF beams produced by the phased array antenna 224 can be controlled. For example, the direction in three-dimensional space towards which a beam 112 is pointed can be controlled.

Figures 3, 4A:
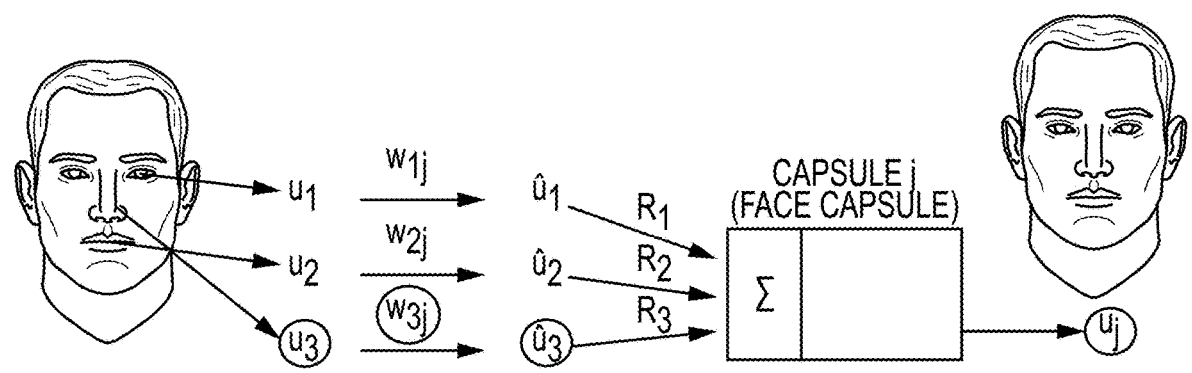
FIG. 3 illustrates the invariance problem that can occur with certain neural networks.
FIG. 4A depicts a Hinton's capsule network.

The improvements in performance over the conventional codebook-search beamforming vector determination approach available using a conventional CNN can be attained by exploiting two types of CNN layers: (1) "Max Pooling" and (2) Convolution (both of which result in some level of invariance). Max pooling is a strategy that uses the maximum value of clustered CNN nodes to reduce model complexity and enable model generalization. Convolution is the application of a convolution kernel (much like blurring) to an image. The use of these types of layers results in invariance, or a "blindness" of the network to certain transformations. For example, CNNs ignore the spatial relationships between objects in an image by assuming that different internal representations of the image (i.e., the re-positioning of objects within an image) do not change the properties of the image (i.e., the whole is viewed as invariant). FIG. 3 depicts an example of the invariance problem that can be present in certain convolutional neural networks. In A of FIG. 3, a first example image contains the numbers 1, 2, 3, and 4, with the numbers arranged in order as one moves from left to right through each row in a descending order. In B of FIG. 3, a second example image also contains the numbers 1, 2, 3, and 4, but in a different order. Because a typical CNN ignores the spatial relationships between objects, it is prone to misclassifying output results. In particular, a conventional CNN will likely determine that the first image A of FIG. 3 is the same as the second image B of FIG. 3. This can in turn lead to incorrect model predictions. Accordingly, more robust and accurate methods are desirable, in order to meet quality of service (QOS) and reliability requirements in real world systems, such as communications networks.

An example of a VBDL model that is capable of maintaining an awareness of spatial relationships, and therefore of providing a more robust neural network, comprising a novel, optimized version of a neural network, is called a Hinton Capsule Network (HCN) (see FIG. 4A). An HCN improves image-classification performance over CNNs by preserving vector-based information such as the pose (i.e., x-y position and orientation) and the relative spatial relationships of objects (i.e., parts) in an image (i.e., a whole), as well as time-dependent spatial behavior such as velocity. As such, an HCN can correctly classify images that can suffer from invariance when processed by a conventional CNN. However, an HCN is generally slower than a CNNs because of the additional information that is propagated through each layer in the network.

Figure 4B:
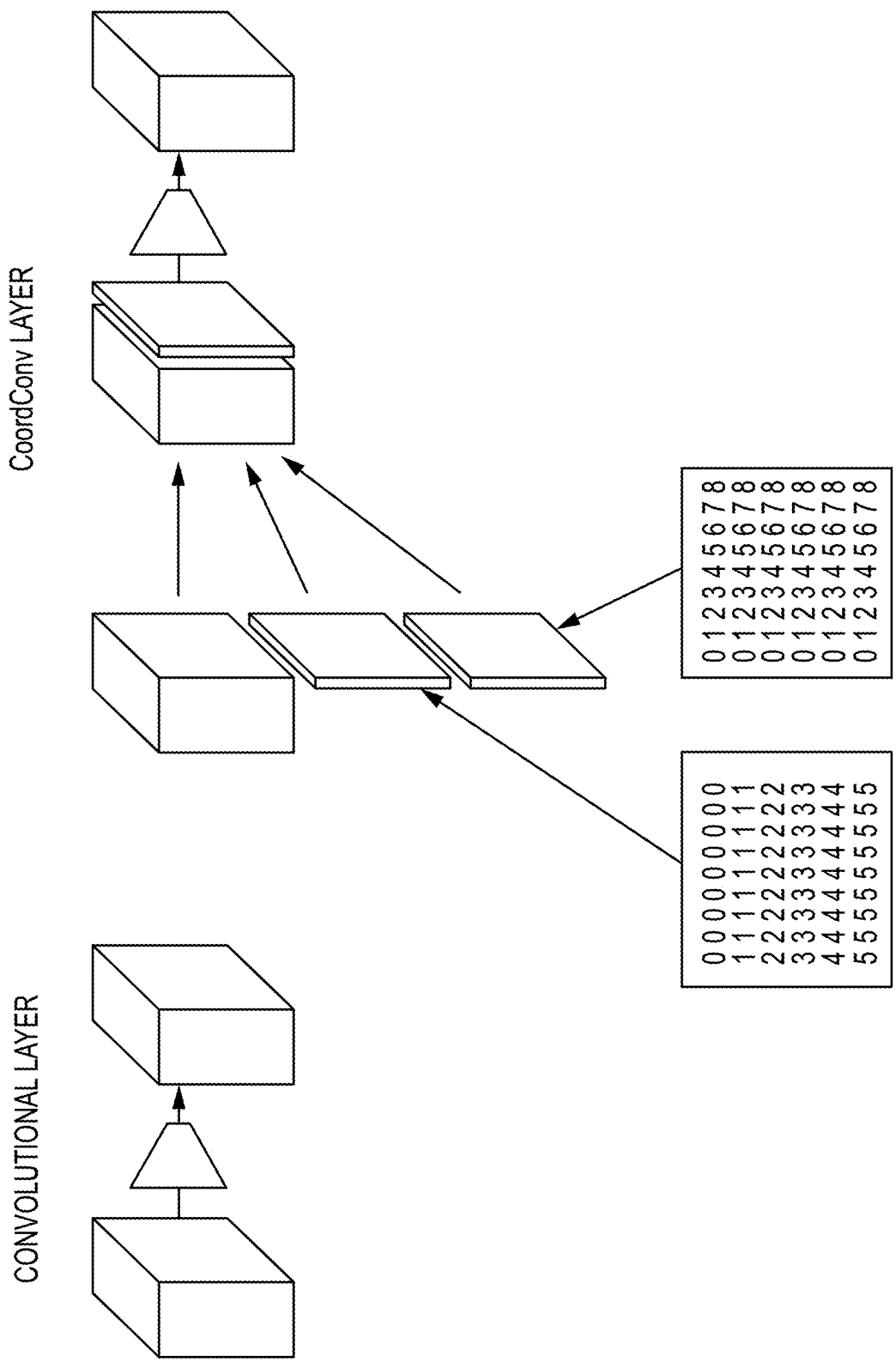
FIG. 4B depicts a neural network with a coordinate convolution (CoordConv) in accordance with embodiments of the present disclosure.

In accordance with other embodiments of the present disclosure, a second VBDL model comprising a novel, optimized version of a neural network called coordinate convolution (CoordConv) is applied (see FIG. 4B). Coord-Conv improves image classification accuracy of CNNs by giving standard CNN input convolutional filters a positional reference. This is done by adding at least two channels to the convolutional layer input, one for each of the Cartesian coordinates (here i and j). This additional information ensures that the CNN output is not invariant to pose, thus improving the classification accuracy (and avoiding the errors as illustrated in FIG. 3). Additionally, CoordConv has been shown to run as fast as CNNs. However, CoordConv still utilizes max pooling as in other CNNs, resulting in some degree of generalization (and thus invariance).

In accordance with embodiments of the present disclosure, the accuracy of CoordConv can be improved by removing the max pooling layer and optimizing the filter size to capture the correlation between co-channel uplink signals.

In accordance with other embodiments of the present disclosure, output information from the convolutional filters may be used in backpropagation or other schemes to optimize weights during training.

In accordance with at least some embodiments of the present disclosure, VBDL models comprising an HCN or a CoordConv network that are optimized for runtime performance and reduced network size (e.g., to fit on small devices with limited memory and processing capabilities) in real-world applications by novel pruning methods are provided. Aspects of such models in accordance with embodiments of the present disclosure are depicted in FIGS. 5A, 5B, and 5C.

Figure 5A:
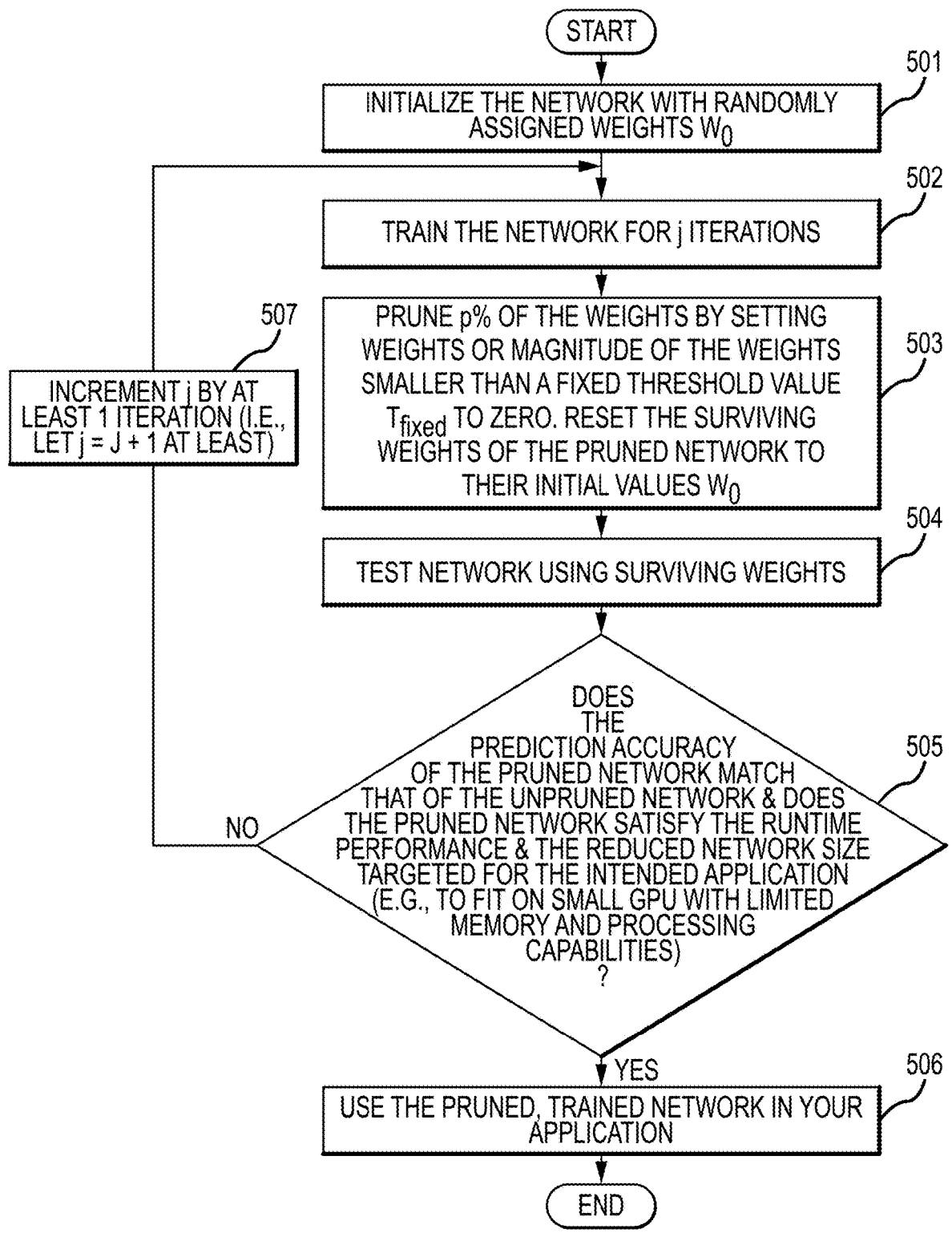
FIG. 5A depicts an iterative pruning process with VBDL weights reset to their initial values in accordance with embodiments of the present disclosure.

FIG. 5A depicts a "weight-reset-to initialized-values" pruning process in accordance with embodiments of the present disclosure that can be applied in connection with executing a VBDL model as disclosed herein. Initially, at step 501, the neural network is initialized using randomly assigned weights $W_0$. The network is then trained through j iterations arriving at weight parameters $W_j$ (step 502). Next, p % of the weights are pruned from the network by setting weights or magnitude of the weights smaller than some threshold value to zero, and the remaining weights of the pruned network are reset to their initial values $W_0$ (step 503). The network is then tested using the surviving weights (step 504). At step 505, the performance of the pruned VBDL model is characterized. For example, a determination is made as to whether the prediction accuracy of the pruned network matches that of the unpruned network and the pruned network satisfies the runtime performance and reduced network size (e.g., to fit on small devices with limited memory and processing capabilities) for the application. The prediction accuracy can be evaluated in connection with the quality of communication signals implemented by beams 112 produced through operation of the VBDL model. If the performance is determined to be adequate, then the optimized, pruned VBDL network implemented by the application programming 236 can be used to predict and produce outputs (step 506). Otherwise, at step 507, the VBDL iteration j is incremented by at least 1 iteration, the surviving weights are returned to their initial values $W_0$, and the process returns to step 501.

Figure 5B:
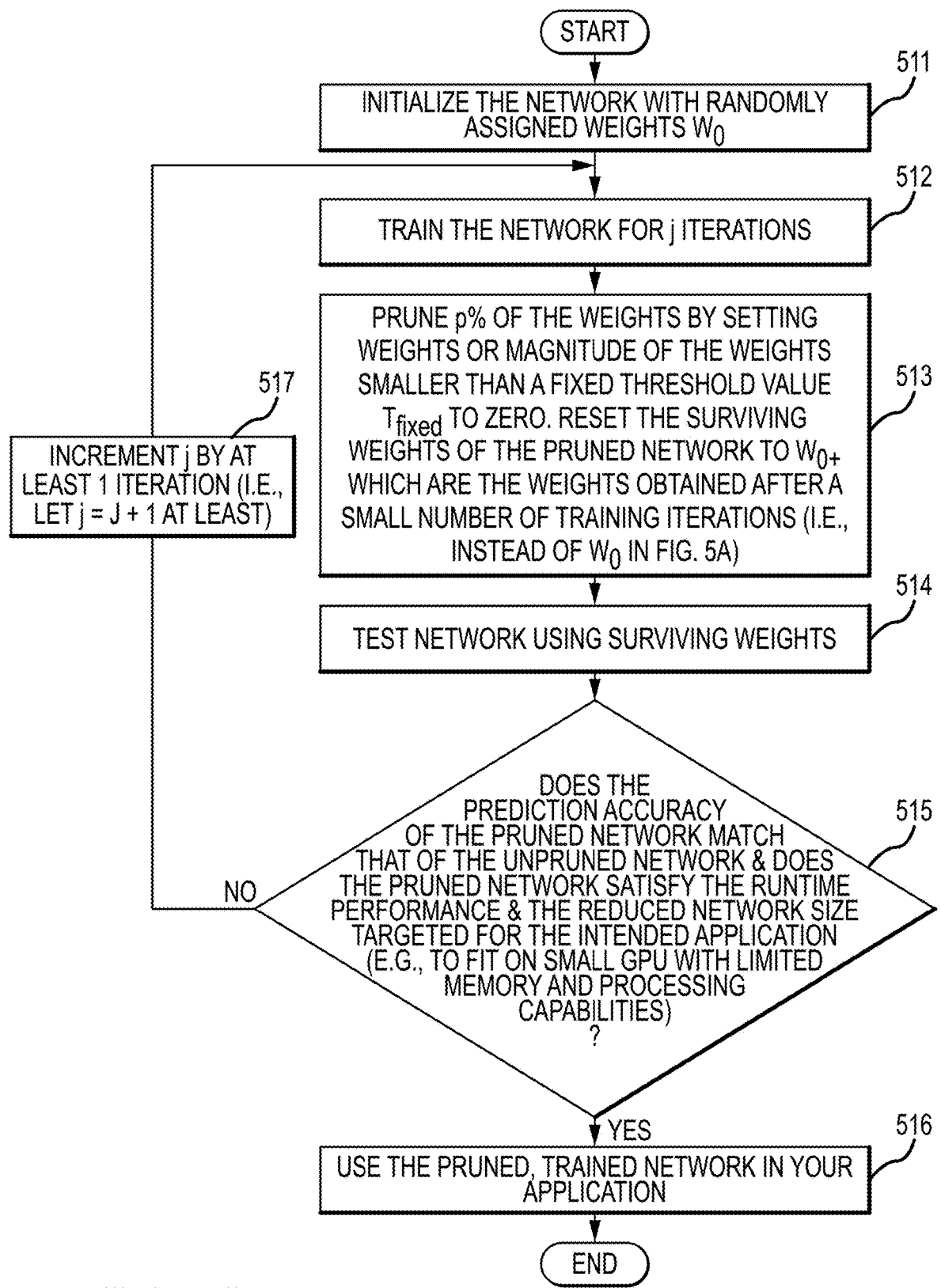
FIG. 5B depicts an iterative pruning process wherein weights are reset to revised values after a small number of training iterations in accordance with other embodiments of the present disclosure.

FIG. 5B depicts a "weight-reset-to-value-after-a-small-number-of-training-iteration" pruning process in accordance with another embodiment of the present disclosure that can be applied in connection with executing a VBDL model as disclosed herein. In this embodiment, rather than resetting the remaining weights of the pruned network to their initial values $W_0$, improved network prediction accuracy is obtained if those weights are set to the weights obtained after a small number of training iteration steps $W_0+$. For this embodiment, initially, at step 511, the neural network is initialized using randomly assigned weights $W_0$. The network is then trained through j iterations arriving at weight parameters $W_j$ (step 512). Next, p % of the weights are pruned from the network by setting weights or magnitude of the weights smaller than some threshold value to zero and the remaining weights of the pruned network are applied at the value obtained after the training through j iterations, $W_0$+(step 513). At step 514, the network is tested using the surviving weights. At step 515, the performance of the pruned VBDL model is characterized. For example, a determination is made as to whether the prediction accuracy of the pruned network matches that of the unpruned network and the pruned network satisfies the runtime performance and reduced network size (e.g., to fit on small devices with limited memory and processing capabilities) for the application. If the performance of the pruned VBDL model is acceptable, the optimized, pruned VBDL network can be used to predict and produce outputs (step 516). Otherwise, at step 517, the VBDL iteration j is incremented by at least 1 iteration, and the values $W_{0+}$ obtained for the surviving weights after the previous round of training are used in further training (step 512).

Figure 5C:
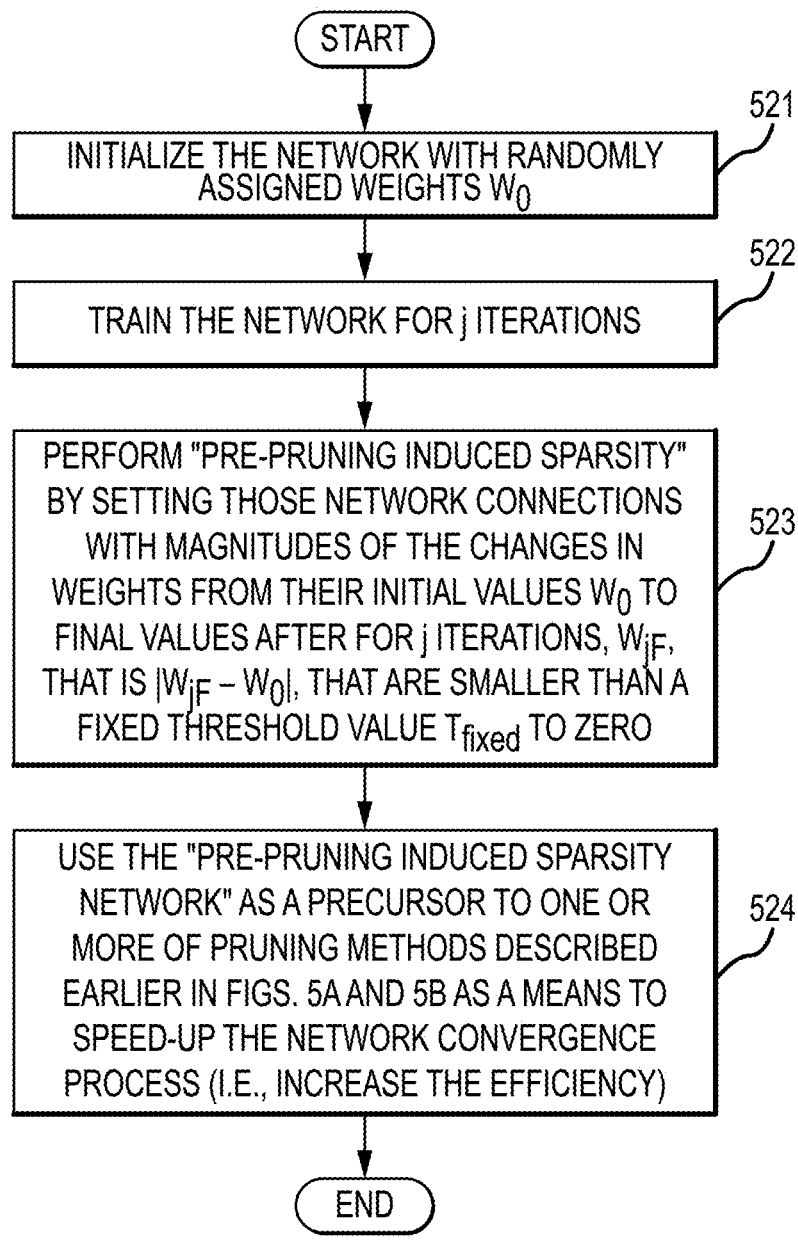
FIG. 5C depicts a one-shot pre-pruning induced sparsity method in accordance with other embodiments of the present disclosure.

In accordance with other embodiments of the present disclosure, the pruning methods described in FIGS. 5A and 5B may be preceded by novel "pre-pruning induced sparsity" methods depicted in FIG. 5C to speed-up the process (i.e., increase the efficiency) of finding the "optimized, pruned VBDL model" with a prediction accuracy matching that of the unpruned network and with runtime performance and reduced network size (e.g., to fit on small devices with limited memory and processing capabilities) appropriate for the application. In this embodiment of the present disclosure, we use the observation that for the optimized VBDL network, the network connections have magnitude of changes in weights from their initial values $W_0$ to some final values $W_{jF}$ after j iterations that are much larger than those that were pruned away, to set thresholds for pre-pruning induced sparsity. For this embodiment, initially, at step 521, the neural network is initialized using randomly assigned weights $W_0$. The network is then trained through j iterations arriving at weight parameters $W_j$ (step 522). Next, at step 523, sparsity is induced in the VBDL network by performing "pre-pruning induced sparsity", in which those network connections with magnitudes of the changes in weights from their initial values $W_0$ to final values after for j iterations, WjF, that is |WjF−Wo|, that are smaller than a fixed threshold value $T_{Fixed}$, to zero. and keeping the rest of the newly created sparse VBDL network connections. This sparse VBDL network may then be used as a precursor to one or more of pruning methods described earlier in FIGS. 5A and 5B as a means to speed-up the process (i.e., increase the efficiency) of finding the "optimized, pruned VBDL".

Figure 5D:
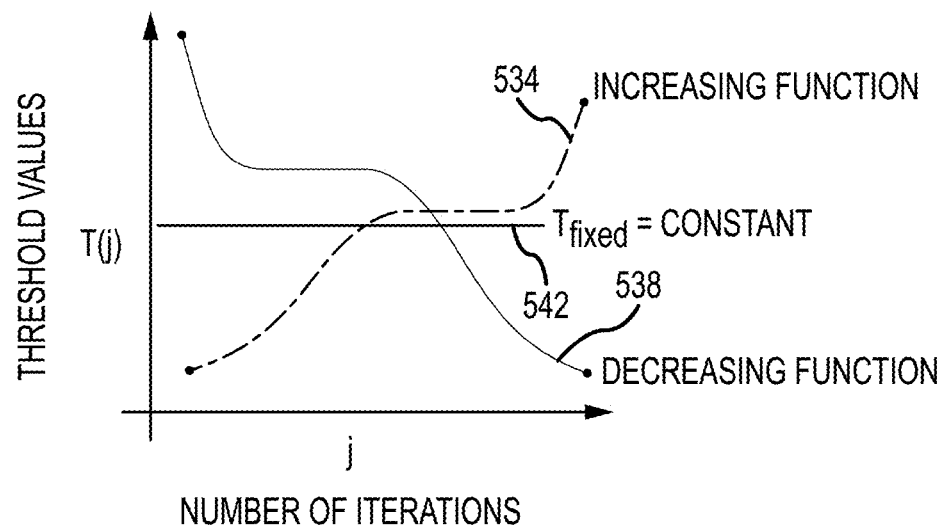
FIG. 5D depicts the introduction of additional dynamism into the pruning or sparsity processes by letting network parameters be variables.
Figure 5D:
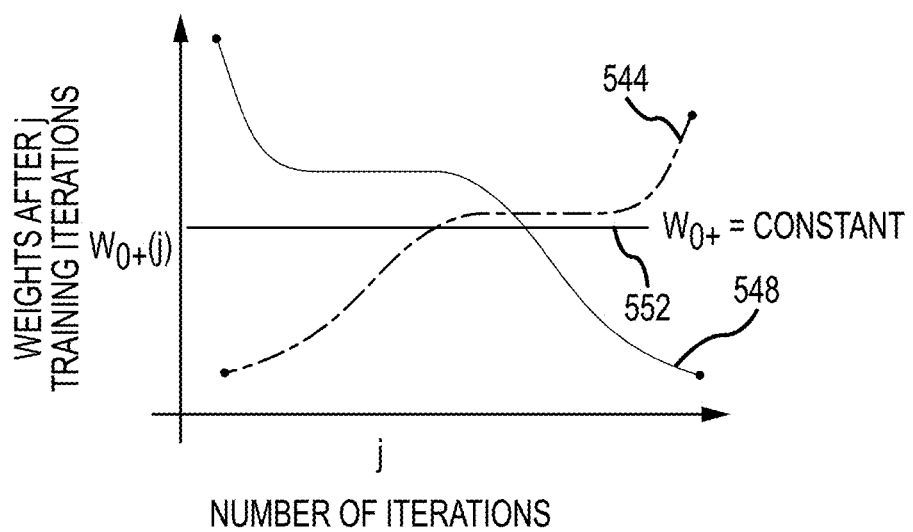

In further embodiments of the present disclosure shown in FIG. 5D, more dynamism with respect to factors such as the convergence rate of the pruned network's accuracy or size reduction may be introduced into the pruning or sparsity processes described in FIGS. 5A, 5B, and 5C by letting network parameters such as the threshold values or $W_{0+}$ be variables instead of the fixed/constant values described in FIGS. 5A, 5B, and 5C. For example, as depicted in A of FIG. 5D, the threshold values may be defined by a function 534 that increases with the number of iterations j, by a function 538 that decreases with the number of iterations j, or the threshold values may be held at a constant value 542. Where the value increases or decreases, the function may be a monotonic function. As another example, as depicted in B of FIG. 5D, the weights can be varied according to a function 544 that increases with the number of iterations j, by a function 548 that decreases with the number of iterations j, or the weights may be held at some constant value 552.

In accordance with other embodiments of the present disclosure, pruning is performed using weight similarity (e.g., cosine distance between weights) to remove redundant branches of the network.

Figure 6:
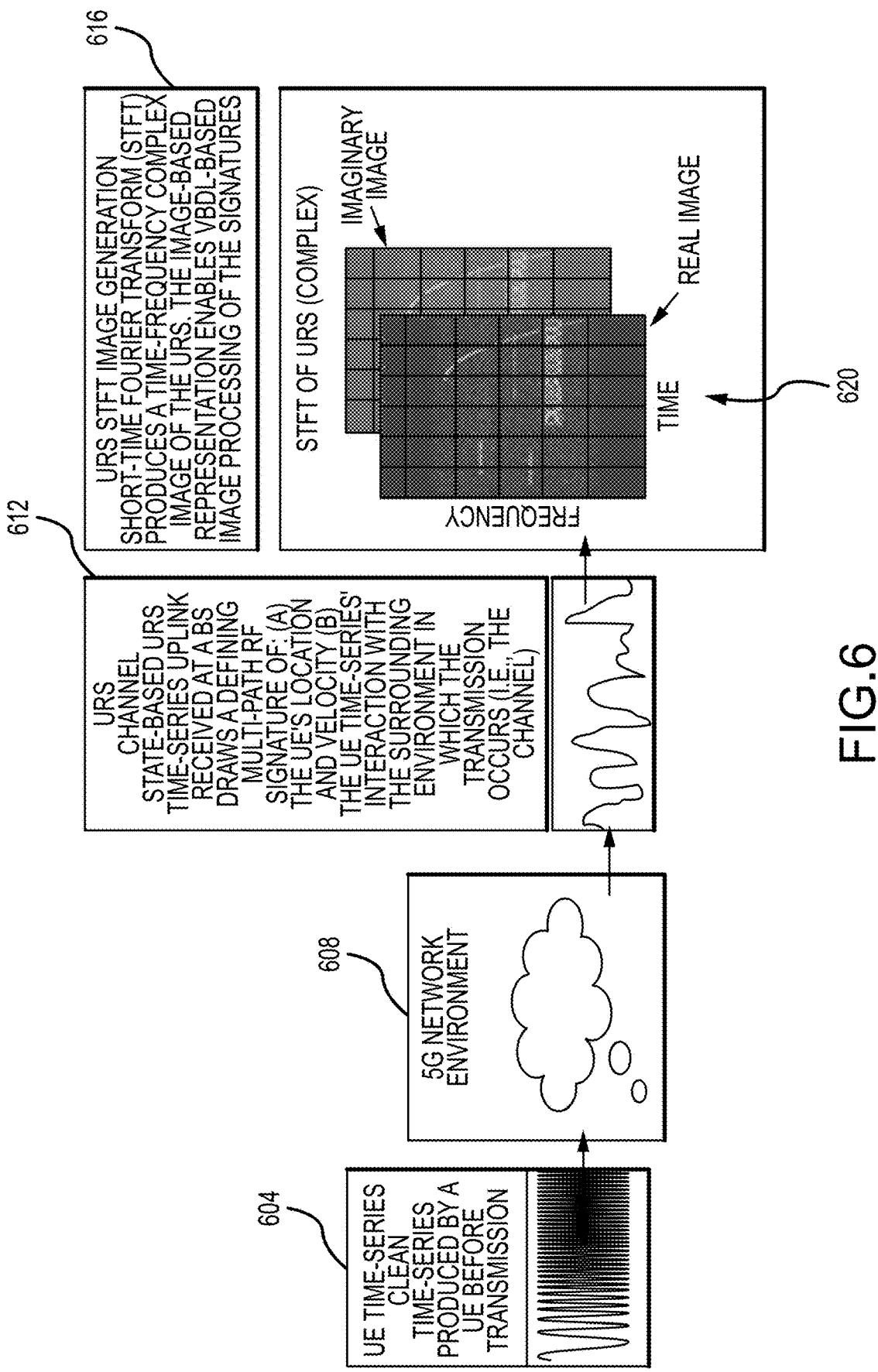
FIG. 6 depicts aspects of a process for producing model input in accordance with embodiments of the present disclosure.

As can be appreciated by one of skill in the art after consideration of the present disclosure, signals used for training a VBDL network as disclosed herein can be real or simulated. For example, as depicted in in FIG. 6, a time series signal 604 is transmitted from a device 108 across a communication network, such as a deployed 5G network 608, resulting in a channel state-based URS time-series signal 612. The URS time-series signal 612 as received at a base station 104 draws a defining multi-path RF signature of the location and velocity of the device 108, and time-series interaction of the device 108 signal with the surrounding environment in which the transmission occurs (i.e. the channel). The URS time series signal 612 is then converted to an image 616, enabling the use of deep learning image processing techniques in accordance with embodiments of the present disclosure. This processing can include taking a Short-time Fourier transform (STFT) of the time-varying URS to produce a set of spectrograms 620, with one spectrogram for the real components and one spectrogram for the imaginary components of each URS 612. The spectrograms 620 are used as input to novel VBDL networks in accordance with embodiments of the present disclosure, for example implemented by a processing system 200, for training and prediction.

Figure 7:
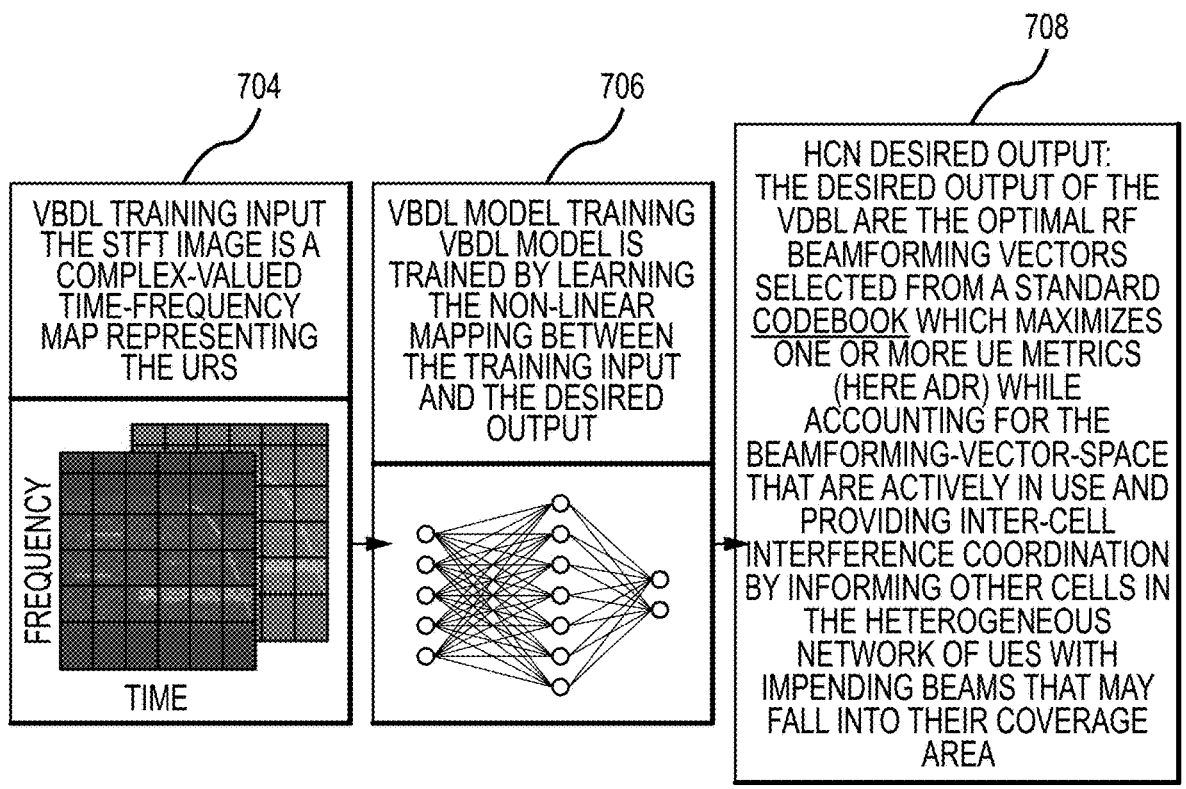
FIG. 7 depicts aspects of a process for training a system model in accordance with embodiments of the present disclosure.

In accordance with embodiments of the present disclosure, during the VBDL network learning phase (FIG. 7), the model (i.e., HCN or CoordConv) implemented by the VBDL network learns the non-linear mapping 706 between the VBDL model training input 704 and the desired output 708. Here, the model training inputs 704 are the STFT-produced magnitude and phase spectrogram images 620. The desired output 708 of the VBDL network is in the form of the optimal RF beamforming vectors at a base station 104 selected from a standard beamforming codebook to optimize the ADR of a device 108 in communication with the base station 104. The VBDL model also can account for the beamforming-vector-space that is actively in use and providing intra-cell interference coordination by informing other cells or base stations 104 in the heterogeneous network of devices 108 with impending beams that may fall into their coverage area.

Figure 8:
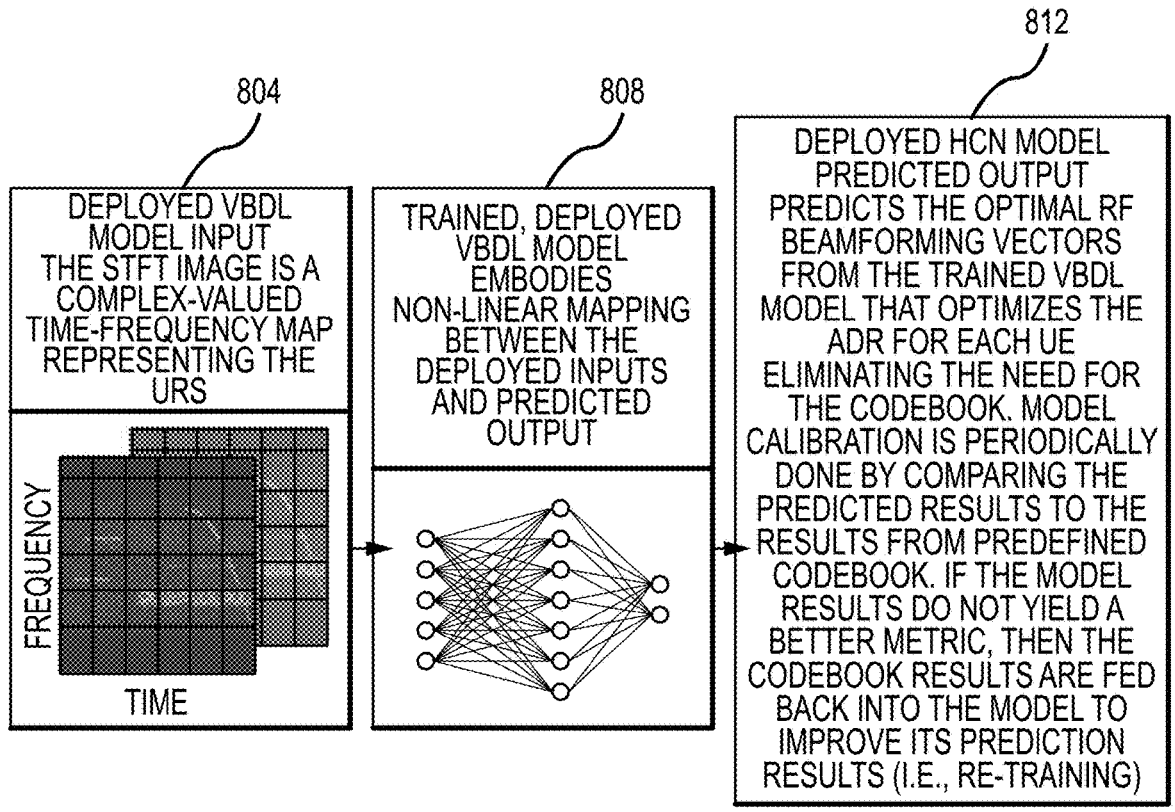
FIG. 8 depicts aspects of a process for predicting optimal beamforming vectors in accordance with embodiments of the present disclosure.

In accordance with further embodiments of the present disclosure, during the model prediction phase (FIG. 8), the system 200 uses the trained VBDL network or model to predict the optimum RF beamforming vectors, to optimize the ADR of a device 108, eliminating the need for the codebook. In particular, the spectrogram images 620 for a device 108 are provided as input 804 to the trained VBDL model 808. The VBDL model 808 performs a non-linear mapping between the deployed beamforming inputs 804 and predicted output 812. The output 812 can then be applied by the system 200 to control a beam or beams 112 produced in connection with operation of a base station or stations 104 in communication with UE 104. Model calibration is periodically done by comparing the predicted results to the results from a predefined codebook. If the model results do not yield better metrics, then the codebook results are fed back into the model to improve its prediction results (i.e., re-training/calibration). Accordingly, a VBDL network trained in accordance with embodiments of the present disclosure an implemented by the execution of application programming 236 by a processor 204 can be deployed to create RF beamforming vectors that are applied by the processing system 200 in operating a base station 104 in connection with communications with one or more instances of UE 108. In particular, in accordance with embodiments of the present disclosure, multiple communication channels using multiple beams 112 can be established by operation of a trained VBDL network. Moreover, the beams 112 can be established without resort to a codebook or table of beamforming vectors. In accordance with still other embodiments, a trained VBDL network can be operated using processing resources, such as a processor 204 and memory 208, with more modest specifications than would be required with a VBDL network that has been trained using other processes. In particular, less processing power and less memory can be required for a VBDL network trained in accordance with pruning techniques of embodiments of the present disclosure than using alternate techniques.

Figure 9:
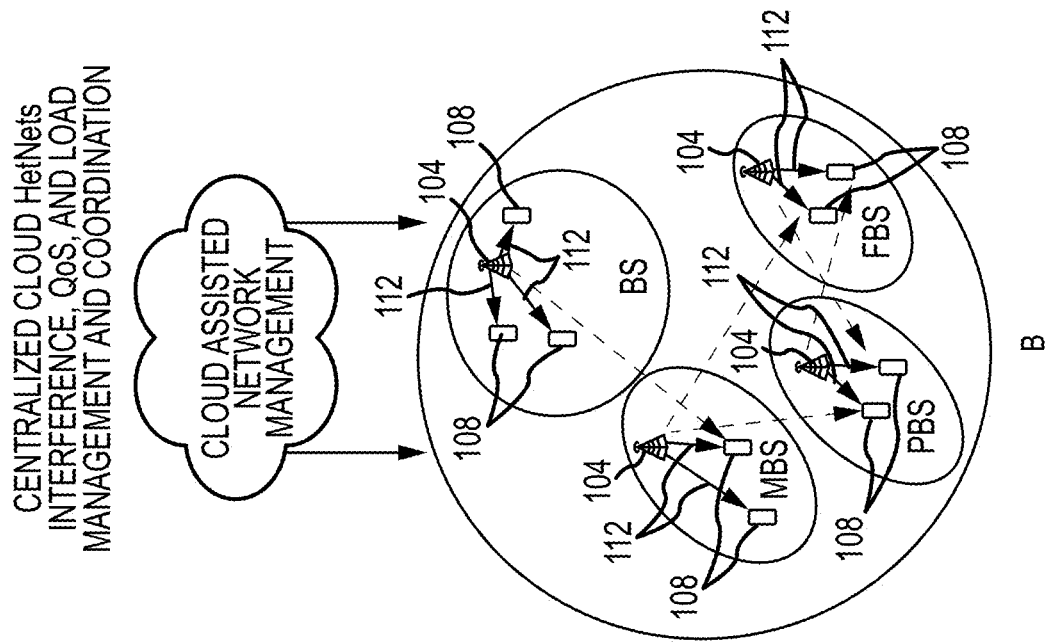
FIG. 9 depicts example communications system scenarios in which multiple base stations serve multiple devices in accordance with embodiments of the present disclosure.
Figure 9:
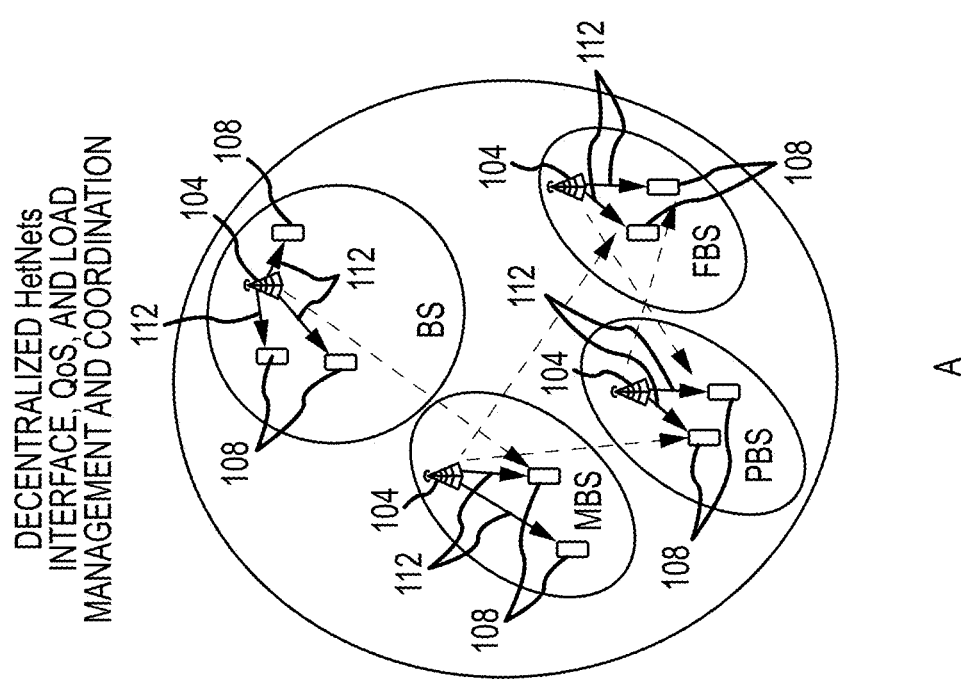

In accordance with further embodiments of the present disclosure, multiple UEs connected to multiple BSs, MBSs, PBS, FBS etc. are modeled (FIG. 9). In A of FIG. 9, a de-centralized HetNets interference, QoS, and load management and coordination model is depicted. In B of FIG. 9, a centralized cloud HetNets interference, QoS, and load management and coordination model is depicted. In these further embodiments, real-world HetNets conditions such as the states, interactions, correlations, and relationships between multiple UEs, BSs, PBS, FBS etc, and their environment within the vicinity of the elements being modeled are considered using an improved RF signature model called the Enhanced Unique RF-Signal Signature (EURS). This EURS model incorporates:

(a) The relative spatial or spatio-temporal relationships of the model-applicable elements in the HetNets such as the relative location, velocities of different UEs or BS elements at a given time, (b) The operational state of the model-applicable elements in the HetNets such as the number and the configuration of active UEs connected to a BS (i.e., the BS beamforming-vector-space including the number of antennas that are actively in use and the number that is available for use) and the sleep-or-active operating mode of other model-relevant UEs or BS-tiers at a given time, (c) BS state values such as its power range (min-max), (d) The state of the model environment such as obstacles and weather conditions, (e) Inter/co-channel and intra-cell interferences characterized by metrics such as the Signal-to-Interference-plus-Noise Ratio (SINR), (f) Positive or negative Load Balancing Power Bias (LBPB) applied to different BS-tiers (e.g., PBS) aimed at balancing the load among them in HetNets, and (g) Network quality characterized by metrics such as a UE's QoS.

The EURS (model input) necessarily contains more information than the URS that does not apply the EURS. Judicious pruning and model optimization is therefore applied to expedite model training without loss of performance.

In accordance with embodiments of the present disclosure, the VBDL model operates to learn and predict the optimum beamforming vectors at a BS, MBS, PBS, FBS etc., that optimizes ADR and other real-world UE metrics such as such SINR and QoS by using the EURS as input to the VBDL model. The VBDL model can also provide BS-tier-coordination. For example, a PBS can optimally learn its positive LBPB while satisfying its own UEs QoS requirements. At the same time, for PBS-MBS coordination, a PBS would inform an MBS (e.g., using backhaul fiber communications or direct RF links) of the MBS potential to cause load balancing and interference issues so that the MBS can serve its own UEs while reducing its LBPB and adhering to a PBS's SINR constraints.

In accordance with embodiments of the present disclosure, the beamforming vector predicted by the VBDL model to optimize the various metrics is provided as an output. That output can then be applied, for example by a beamforming network 220, to control the phased array antenna 224 of a base station 104 to produce the desired beam or beams for communications with one or more devices 108. Moreover, the VBDL model can be executed by a processing system 200 provided as part of a single base station 104, or can be executed by a processing system 200 provided separately from a base station 104. Whether integrated with a base station or not, a processing system 200 in accordance with embodiments of the present disclosure can serve one or more base stations 104.

As discussed herein, training and deployment of a VBDL model can include pruning. Pruning can be achieved by identifying parts of the trained model that are not activated after training is complete, and by identifying those parts of the trained network that do not contribute to the specific vector outputs of interests selected for a particular application. In general pruning simplifies the number of operations for optimized runtime performance and concentrates the model and effectively identify the signal attributes used to determine an optimal beamforming vector.

The foregoing discussion of the disclosed systems and methods has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described herein are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method, comprising:
receiving a time series signal;
transforming the time series signal to a spectrogram of real components and a spectrogram of imaginary components of the time series signal;
inputting the spectrogram of real components and the spectrogram of imaginary components of the time series signal to a vector based deep learning (VBDL) model; and
using the VBDL model to predict an optimal beamforming vector.

2. The method of claim 1, wherein the VBDL model implements a pruned Hinton's capsule network.

3. The method of claim 1, wherein the VBDL model implements a coordinate convolution model that includes first and second Cartesian coordinates as inputs.

4. The method of claim 1, further comprising:
forming a beam of a phased array antenna by applying the predicted optimal beam forming vector, wherein the VBDL model is trained with reference to a beamforming codebook, and wherein the VBDL model outputs a predicted optimal beamforming vector without reference to the beamforming codebook.

5. The method of claim 1, further comprising:
pruning the VBDL model, wherein weights that are less than a threshold value are pruned from the VBDL model.

6. The method of claim 5, wherein the threshold value is varied according to a first function.

7. The method of claim 5, wherein pruning the VBDL model includes:
assigning random values to a set of weights;
training the VBDL model until it converges;
pruning p % of the weights;
resetting the weights remaining after the pruning to the initially assigned values;
training the VBDL model using the reset weights until the model converges; and
using the trained VBDL model to predict an optimal beamforming vector.

8. The method of claim 7, further comprising:
comparing the performance of the trained VBDL model to the unpruned VBDL model;
applying the trained VBDL model if the performance is close that of the unpruned VBDL model; and
applying the unpruned VBDL model if the performance is not close to that of the unpruned VBDL model.

9. The method of claim 5, wherein pruning the VBDL model includes:
assigning random values to a set of weights;
training the VBDL model until it converges;
pruning p % of the weights;
resetting the weights remaining after the pruning to the initially assigned values;
iteratively training the VBDL model using the reset weights for a selected number of iterations; and
using the trained VBDL model to predict an optimal beamforming vector.

10. The method of claim 9, further comprising:
comparing the performance of the trained VBDL model to the unpruned VBDL model;
applying the trained VBDL model if the performance is close that of the unpruned VBDL model; and
applying the unpruned VBDL model if the performance is not close to that of the unpruned VBDL model.

11. A system, comprising:
an antenna;
a beamforming network coupled to the antenna;
a transceiver coupled to the beamforming network;
a processor, the processor configured to:
implement a vector based deep learning (VBDL) model, wherein a time series signal received at the antenna and passed through the beamforming network and the transceiver to the processor is transformed into a spectrogram of real components and a spectrogram of imaginary components of the time series signal, and wherein the spectrogram of real components and the spectrogram of imaginary components of the time series signal are input to the VBDL model;
output from the VBDL model a predicted optimum beamforming vector for the time series signal received at the antenna; and
apply the predicted optimum beamforming vector to form an antenna beam by controlling the beamforming network.

12. The system of claim 11, wherein at least the antenna, the beamforming network, and the transceiver are part of a communication system base station.

13. The system of claim 12, wherein the communication system is a 5G communication system.

14. The system of claim 11, wherein the processor is further configured to:
prune the VBDL model.

15. The system of claim 14, wherein pruning the VBDL model includes:
assigning random values to a set of weights;
training the VBDL model until it converges;
pruning p % of the weights;
resetting the weights remaining after the pruning to the initially assigned values;
training the VBDL model using the reset weights until the model converges; and
using the trained VBDL model to predict an optimal beamforming vector.

16. The system of claim 15, wherein the processor is further configured to:
compare the performance of the trained VBDL model to the unpruned VBDL model;
apply the trained VBDL model if the performance is close that of the unpruned VBDL model; and
apply the unpruned VBDL model if the performance is not close to that of the unpruned VBDL model.

17. The system of claim 14, wherein pruning the VBDL model includes:
assigning random values to a set of weights;
training the VBDL model until it converges;
pruning p % of the weights;
resetting the weights remaining after the pruning to the initially assigned values;
iteratively training the VBDL model using the reset weights for a selected number of iterations; and
using the trained VBDL model to predict an optimal beamforming vector.

18. The system of claim 17, wherein the processor is further configured to:
compare the performance of the trained VBDL model to the unpruned VBDL model;
apply the trained VBDL model if the performance is close that of the unpruned VBDL model; and
apply the unpruned VBDL model if the performance is not close to that of the unpruned VBDL model.

* * * * *

UNITED STATES PATENT AND TRADEMARK OFFICE
CERTIFICATE OF CORRECTION

PATENT NO. : 11,303,348 B1
APPLICATION NO. : 16/886154
DATED : April 12, 2022
INVENTOR(S) : Bevan D. Staple et al.

It is certified that error appears in the above-identified patent and that said Letters Patent is hereby corrected as shown below:

On the Title Page

In Item (72), Line 3, please delete "Monin" and insert --Monnin--.

Signed and Sealed this
Thirteenth Day of December, 2022

*Katherine Kelly Vidal*

Katherine Kelly Vidal
*Director of the United States Patent and Trademark Office*